United States Patent
Jiao et al.

(10) Patent No.: US 11,387,067 B2
(45) Date of Patent: Jul. 12, 2022

(54) CIRCUIT INTERRUPTER WITH GROUND FAULT SELF-TEST AND ASSOCIATED METHOD

(71) Applicant: EATON CORPORATION, Cleveland, OH (US)

(72) Inventors: Jian Jiao, Sewickley, PA (US); Adonna Angelika Anderson, Pittsburgh, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 1070 days.

(21) Appl. No.: 15/625,230

(22) Filed: Jun. 16, 2017

(65) Prior Publication Data

US 2018/0366291 A1    Dec. 20, 2018

(51) Int. Cl.
| | | |
|---|---|---|
| *H02H 9/08* | (2006.01) |
| *H01H 83/04* | (2006.01) |
| *H01H 71/04* | (2006.01) |
| *H02H 3/02* | (2006.01) |
| *H02H 3/33* | (2006.01) |
| *H01H 71/24* | (2006.01) |

(52) U.S. Cl.
CPC ............ *H01H 83/04* (2013.01); *H01H 71/04* (2013.01); *H02H 3/021* (2013.01); *H02H 3/335* (2013.01); *H01H 71/24* (2013.01); *H01H 2071/044* (2013.01)

(58) Field of Classification Search
CPC ........ H01H 83/00; H01H 83/04; H01H 71/04; H01H 71/24; H02H 1/0007
USPC .......................................................... 361/49
See application file for complete search history.

(56) References Cited

U.S. PATENT DOCUMENTS

| | | | |
|---|---|---|---|
| 6,421,214 B1 * | 7/2002 | Packard ................. | H02H 3/335 361/7 |
| 2008/0106833 A1 * | 5/2008 | Lewinski ............. | G01R 31/025 361/49 |
| 2014/0254050 A1 * | 9/2014 | Haines ............... | G01R 31/3277 361/42 |

\* cited by examiner

*Primary Examiner* — Jared Fureman
*Assistant Examiner* — Lucy M Thomas
(74) *Attorney, Agent, or Firm* — Eckert Seamans Cherin & Mellott, LLC

(57) ABSTRACT

A circuit interrupter is structured to protect a protected circuit. The circuit interrupter includes a ground fault current sensor structured to sense a ground fault current in the protected circuit and a processor including a routine structured to perform a ground fault output self-test. The ground fault output self-test includes to output a trip signal within a predetermined phase angle of a zero-crossing of current flowing through the protected circuit, to stop outputting the trip signal before the zero-crossing, to determine whether the trip signal caused a pulse in the ground fault current, and to determine whether the circuit interrupter passed the ground fault output self-test based on whether the trip signal caused a pulse in the ground fault current.

20 Claims, 4 Drawing Sheets

CIRCUIT INTERRUPTER WITH GROUND FAULT SELF-TEST AND ASSOCIATED METHOD

BACKGROUND

Field

The disclosed concept relates generally to circuit interrupters, and in particular, to circuit interrupters with a ground fault output self-test.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

One type of fault condition is a ground fault. Under normal operating conditions, the current between line and neutral conductors in a circuit interrupter will be equal, but opposite in direction, indicating that all current provided via the line conductors is returning via the neutral conductors. In the case of a ground fault, the current between the line and neutral conductors is not equal. This inequality may be due to an object contacting a conductor in the protected circuit and creating an alternative path to ground. As a result, some of the current provided via the line conductor does not return via the neutral conductor.

Circuit interrupters that provide ground fault protection have sensors and associated circuitry to detect when a ground fault is present. The circuit interrupters also have separable contacts and the associated circuitry and mechanisms to trip open the separable contacts and prevent current from flowing through the protected circuit in the case of a ground fault. It is beneficial to test the components of circuit interrupters to check that they can properly detect a ground fault and cause a trip in case of a detected ground fault. Moreover, the UL 943 standard requires that circuit interrupters providing ground fault protection must be able to perform a self-test. However, adding specialized testing circuitry adds to the cost of circuit interrupters and causing a trip as part of the test can be inconvenient for users of the circuit interrupter.

There is room for improvement in circuit interrupters. There is also room for improvement in methods of testing circuit interrupters.

SUMMARY

These needs and others are met by embodiments of the disclosed concept in which a circuit interrupter is capable of performing a self-test including a ground fault output self-test to determine whether the circuit interrupter can trip open separable contacts in response to detecting a ground fault. In some example embodiments of the disclosed concept, a trip signal is output near a zero-crossing that causes a pulse that is small and narrow so that it does not have an impact ground fault or grounded neutral detection.

In accordance with one aspect of the disclosed concept, a circuit interrupter structured to protect a protected circuit comprises: a ground fault current sensor structured to sense a ground fault current in the protected circuit; a processor including a routine structured to perform a ground fault output self-test, the ground fault output self-test including: to output a trip signal within a predetermined phase angle of a zero-crossing of current flowing through the protected circuit; to stop outputting the trip signal before the zero-crossing; to determine whether the trip signal caused a pulse in the ground fault current; and to determine whether the circuit interrupter passed the ground fault output self-test based on whether the trip signal caused a pulse in the ground fault current.

In accordance with another aspect of the disclosed concept, a method of performing a ground fault output self-test in a circuit interrupter comprises: outputting a trip signal within a predetermined phase angle of a zero-crossing of current flowing through a protected circuit; stopping output of the trip signal before the zero-crossing; determining whether the trip signal caused a pulse in the ground fault current; and determining whether the ground fault output self-test has been passed based on whether the trip signal caused a pulse in the ground fault current.

In accordance with another aspect of the disclosed concept, a non-transitory computer readable medium storing one or more programs, including instructions, which when executed by a computer, causes the computer to perform a method of performing a ground fault output self-test in a circuit interrupter comprising: outputting a trip signal within a predetermined phase angle of a zero-crossing of current flowing through a protected circuit; stopping output of the trip signal before the zero-crossing; determining whether the trip signal caused a pulse in the ground fault current; and determining whether the ground fault output self-test has been passed based on whether the trip signal caused a pulse in the ground fault current.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
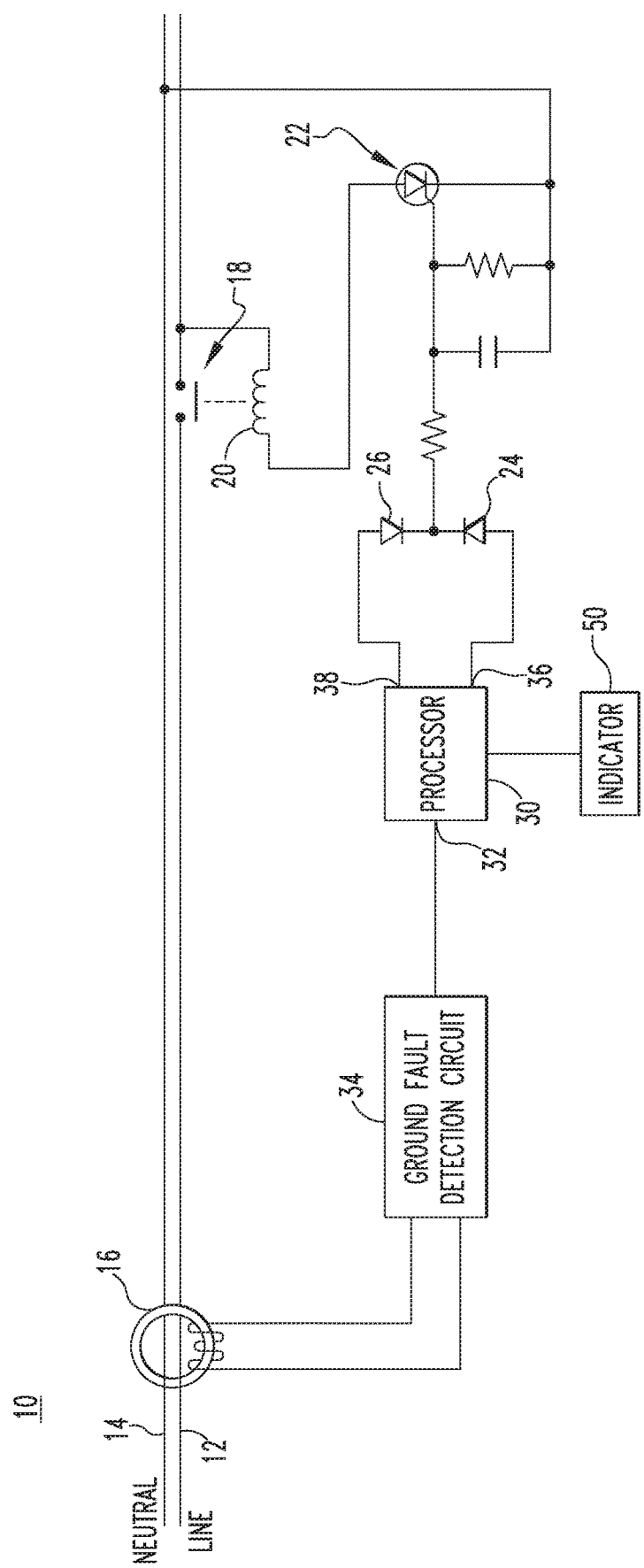
FIG. 1 is a schematic diagram of a circuit interrupter in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve, and process data; a microprocessor; a microcontroller; a microcomputer; a central processing unit; or any suitable processing device or apparatus.

As employed herein, the term "ground fault input self-test" shall refer to a circuit interrupter self-test designed to test the circuit interrupter's ability to detect a ground fault.

As employed herein, the term "ground fault output self-test" shall refer to a circuit interrupter self-test design to test the circuit interrupter's ability to trip open separable contacts in response to detecting a ground fault.

FIG. 1 is a schematic diagram of a circuit interrupter 10 in accordance with an example embodiment of the disclosed concept. The circuit interrupter 10 is structured to be electrically connected on a protected circuit between a power source (not shown) and a load (not shown). Power from the power source is conducted through the circuit interrupter 10 to the load via line and neutral conductors 12, 14 included in the circuit interrupter 10.

The circuit interrupter 10 includes separable contacts 18. The separable contacts 18 are disposed along the line conductor 12 and tripping open the separable contacts 18 stops current from flowing through the line conductor 18. The circuit interrupter 10 further includes an operating mechanism 20 structured to trip open the separable contacts. In some example embodiments of the disclosed concept, the operating mechanism is a solenoid structured to activate to cause the separable contacts 18 to trip open. Passing sufficient current through a coil of the solenoid causes the solenoid to activate and cause the separable contacts 18 to trip open. However, it will be appreciated by those having ordinary skill in the art that other types of operating mechanisms may be employed in the circuit interrupter 10 without departing from the scope of the disclosed concept.

The circuit interrupter 10 further includes a silicon controller rectifier (SCR) 22 and a processor 30. The operating mechanism 20 and the SCR 22 are electrically connected in series between the line and neutral conductors 12, 14. The gate of the SCR 22 is electrically coupled the processor 30. The processor 30 is structured to output a trip signal to the gate of the SCR 22. When the processor 30 outputs the trip signal to the gate of the SCR 22, the SCR 22 turns "on" and allows current to flow from between the line and neutral conductors 12, 14 through the operating mechanism 20 and the SCR 22, which in turn causes the operating mechanism 20 to activate and trip open the separable contacts 18. The circuit interrupter further includes diodes 24 and 26 electrically coupled between processor 30 and the gate of the SCR 22. A trip signal output by the processor 30 flows through one or both of the didoes 24 and 26.

The processor 30 is structured to receive inputs from one or more sensors (e.g., without limitation, current sensors, temperature sensors, a ground fault current sensor 16, etc.) and sense for fault conditions (e.g., without limitation, overcurrent, ground fault, arc fault, etc.) on the protected circuit. The processor 30 is also structured to determine whether to trip open the separable contacts 18 in response to sensing a fault condition and, if it is determined that the separable contacts 18 should be tripped open, the processor 30 outputs a trip signal.

To detect a ground fault, the processor 30 receives a ground fault current sensed by the ground fault sensor 16. The ground fault current sensor 16 is structured to sense the difference in current flowing between the line and neutral conductors 16. A ground fault detection circuit 34 is electrically connected between the ground fault current sensor 16 and the processor 30, as is shown in FIG. 1. The ground fault detection circuit 34 includes various circuit components that condition the output of the ground fault current sensor 16 before providing the ground fault current to the processor 30 at a ground fault current input 32 of the processor 30.

The processor 30 also includes a first trip output 24 and a second trip output 26. The processor 30 is structured to output trip signals via one or both of the first and second trip output 24, 26. The first and second trip outputs 24, 26 are electrically coupled to the gate of the SCR 22 via the diodes 24, 26.

The processor 30 may also have an associated memory (not shown). The processor 30 may be, for example and without limitation, a microprocessor, a microcontroller, or some other suitable processing device or circuitry, that interfaces with the memory or another suitable memory. The memory may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may store one or more routines which, when executed by the processor 30, cause the processor 30 to implement at least some of its functionality. Examples of some routines that may be performed by the processor 30 include, without limitation, a ground fault input self-test and a ground fault output self-test, some examples of which will be described in more detail hereinafter.

It will be appreciated by those having ordinary skill in the art that FIG. 1 illustrates an example embodiment of the disclosed concept. The circuit components and their arrangement shown in FIG. 1 are one example of how the disclosed concept may be implemented. It will be appreciated by those having ordinary skill in the art that different circuit components and/or a different arrangement of circuit components may be employed without departing from the scope of the disclosed concept.

In order to successfully trip open the separable contacts 18 in response to a ground fault, the circuit interrupter 10 must be able to properly detect a ground fault. The circuit interrupter 10 must also be able to properly trip open the separable contacts 18 in response to detecting the ground fault. The circuit interrupter 10 is structured to perform a ground fault self-test by performing a ground fault input self-test (i.e., self-test the circuit interrupter's 10 ability to detect a ground fault) and a ground fault output self-test (i.e., self-test the circuit interrupter's 10 ability to trip open the separable contacts 18 in response to detecting the ground fault).

The ground fault input self-test may be performed in various manners without departing from the scope of the disclosed concept. For example and without limitation, the processor 30 may cause a simulated ground fault current to be injected at the output of the ground fault current sensor 16 and the processor 30 may determine whether it is able to successfully detect a ground fault based on the simulated ground fault current. However, it will be appreciated by those having ordinary skill in the art that various other methods of performing a ground fault input self-test may be employed without departing from the scope of the disclosed concept.

To perform the ground fault output self-test, the processor 30 outputs a trip signal for a limited amount of time. The processor 30 outputs the trip signal during a positive half-cycle within a predetermined phase angle before a zero-crossing of the current flowing through the protected circuit. The processor 30 then stops outputting the trip signal before the zero-crossing. For example and without limitation, the processor 30 is structured to output the trip signal during the positive half-cycle when the phase angle is within 15 degrees of reaching the zero-crossing. The processor 30 is also structured to stop outputting the trip signal before the zero-crossing.

Outputting the trip signal just before the zero-crossing turns the SCR 22 "on" and allows current to flow between the line and neutral conductors 12, 14 through the operating mechanism 20 and the SCR 22. However, the trip signal is output close to the zero-crossing and only for a short amount of time so the current passing through the operating mechanism 20 is not large enough to activate the operating mechanism 20 and cause the separable contacts 18 to trip open. For example, the current flowing through the coil of the solenoid is insufficient to activate the solenoid and cause the separable contacts 18 to trip open. The current that flows through the operating mechanism 20 and the SCR 22, however, does cause a difference in the currents flowing through the line and neutral conductors 12, 14 that may be sensed by the ground fault current sensor 16. In particular, turning on the SCR 22 for a short amount of time will cause a pulse in the ground fault current provided at the ground fault current input 32 of the processor 30.

During the ground fault output self-test, the processor 30 monitors for and determines whether the pulse in the ground fault current is present. That is, the processor 30 determines whether the outputting the trip signal has caused a pulse in the ground fault current. If the processor 30 determines that the pulse is present, the processor 30 determines that the circuit interrupter 10 has passed the ground fault output self-test. Passing the ground fault output self-test is indicative of the circuit interrupter's ability to trip open the separable contacts 18 in response to a ground fault being detected. In particular, passing the ground fault output self-test in indicative of proper operation and/or integrity of the diodes 24, 26, the SCR 22, the operating mechanism 20, and/or the separable contacts 18.

If, on the other hand, the processor 30 does not detect the pulse in the ground fault current, the processor 30 determines that the circuit interrupter 10 has failed the ground fault output self-test. In response to failing the ground fault output self-test, the processor 30 may output an error signal. In some example embodiments of the disclosed concept, the error signal may cause an indicator 50 (e.g. without limitation, a light emitting diode, an audible alarm, etc.) to activate. Failing the ground fault output self-test may indicate that the circuit interrupter 10 is unable to trip open the separable contacts 18 and is, thus, unable to protect the protected circuit. Activating the indictor 50 may bring the error to the attention of a user so that the circuit interrupter 10 may be serviced.

In some example embodiments of the disclosed concept, the processor 30, upon being unable to detect the pulse in the ground fault current and determining that the circuit interrupter 10 has failed the ground fault output self-test, may cause the ground fault output self-test to be repeated. When the processor 30 may determines that circuit interrupter 10 has failed the ground fault output self-test a predetermined consecutive number of times, the processor 30 may output the error signal. For example and without limitation, in some example embodiments of the disclosed concept, the processor 30 determines that the circuit interrupter 10 has failed the ground fault output self-test and outputs the error signal to the indicator 50 when the processor 30 is unable to detect the pulse in the ground fault current during 5 consecutive instances of the ground fault output self-test. A predetermined number of cycles (e.g., without limitation, five cycles) may be disposed between each repeated instance of the ground fault output self-test. Waiting to output the error signal until the processor 30 is unable to detect the pulse in ground fault current during a predetermined consecutive instances of repeating the ground fault output self-test reduces the instances of false positives in the ground fault output self-test.

The processor 30 may determine whether the pulse is present in the ground fault current using any suitable method. In one example embodiment of the disclosed concept, the processor 30 integrates the ground fault current during a predetermined period of time (e.g., without limitation, a half-cycle) where the pulse is expected to be present. Integrating the ground fault current causes the effect of the pulse to be much more pronounced and easier to detect. In some example embodiments of the disclosed concept, the processor 30 may also compare the integrated ground fault current to an integration of the ground fault current during a predetermined period of time where the pulse is not expected to be present. For example and without limitation, the processor 30 may integrate the ground fault current for a half-cycle where the pulse is expected to be present and the half-cycle before the pulse is expected to be present. The processor 30 may, for example, subtract the results of the integrations and determine that the pulse is present if the result is greater than a predetermined threshold level. The pulse would cause its corresponding integrated ground fault current to differ from the integrated ground fault current where the pulse is not present. The pulse being present during one of the half-cycles would cause a result of the subtraction to have a value above a predetermined threshold level while the pulse being present during neither of the half-cycles would cause a result of the subtraction to be near zero and below the predetermined threshold level.

It will be appreciated by those having ordinary skill in the art that the processor 30 may use other methods to determine whether the pulse is present without departing from the scope of the disclosed concept. For example and without limitation, the processor 30 may track the peak value of the ground fault current rather than using integration to more easily detect the presence of the pulse.

Figure 2:
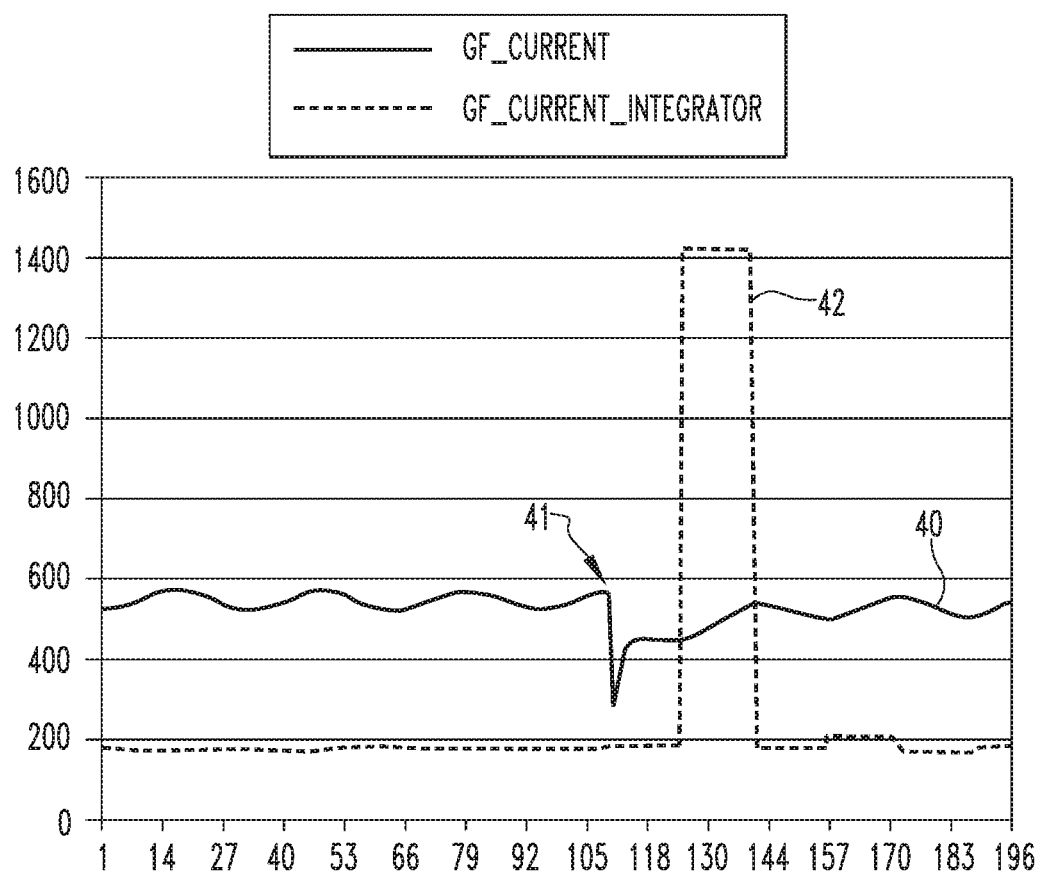
FIG. 2 is a chart of a ground fault current and an integrated ground fault current in accordance with an example embodiment of the disclosed concept.

FIG. 2 is a chart of a ground fault current 40 and an integrated ground fault current 42 versus time in accordance with an example embodiment of the disclosed concept. The chart shown in FIG. 2 is representative of the effect on the ground fault current 40 when the processor 30 outputs the trip signal for a short time as part of the ground fault output self-test. As shown in FIG. 2, the ground fault current 40 includes a pulse 41 that corresponds to when the trip signal is output by the processor 30. Also, as shown in FIG. 2, the effect of the pulse 41 is more pronounced in the integrated ground fault current 42, which makes it easier for the processor 30 to detect the pulse 41 in the ground fault current 40.

Figure 3:
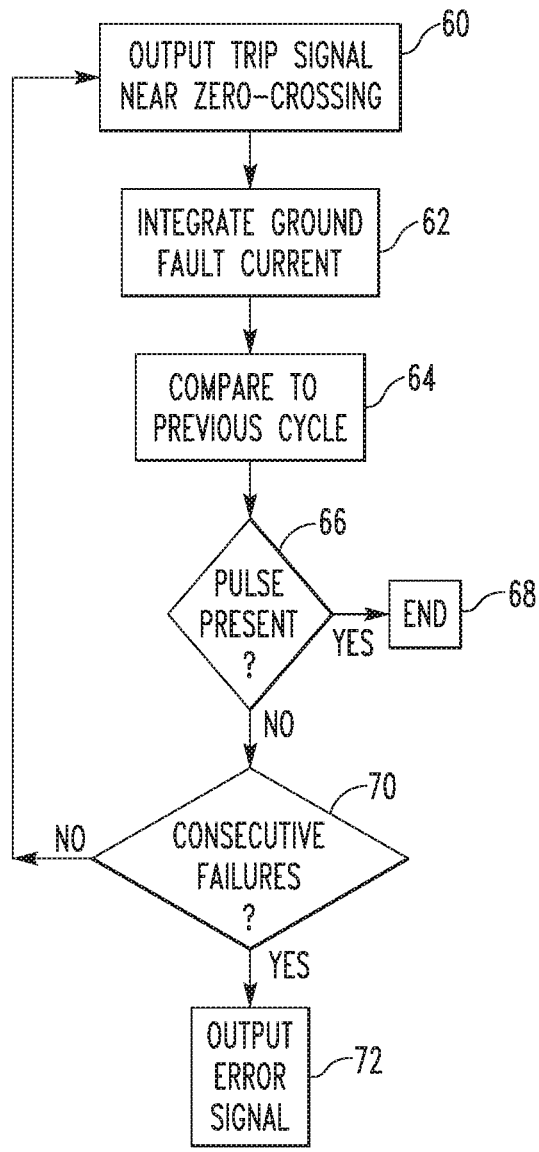
FIG. 3 is a flow chart of a method of performing a ground fault output self-test in accordance with an example embodiment of the disclosed concept.

FIG. 3 is a flow chart of a method of performing a ground fault output self-test in accordance with an example embodiment of the disclosed concept. The method of FIG. 3 may be implemented, for example, in the circuit interrupter 10 of FIG. 1. However, it will be appreciated by those having ordinary skill in the art that the method of FIG. 3 may be implemented in other circuit interrupters without departing from the scope of the disclosed concept.

The method begins at 60 where the processor 30 outputs the trip signal near the zero-crossing. The trip signal may be output within a predetermined phase angle of the zero-crossing. The processor 30 stops outputting the trip signal before the zero-crossing. If the circuit interrupter 10 is operating properly, the trip signal should cause a pulse in the ground fault current. At 62, the processor 30 integrates the ground fault current during a predetermined period of time (e.g., without limitation, a half-cycle) where the pulse is expected to be present. At 64, the processor 30 compares the integrated ground fault current to an integrated ground fault current for a period of time (e.g., without limitation, a cycle) previous to the period of time where the pulse is expected to be present.

At 66, the processor 30 determines whether the pulse is present as a result of outputting the trip signal. In some example embodiments, the processor 30 compares the integrated periods of time of the ground fault current and determined whether their difference is greater than a predetermined threshold level. If the difference is greater than a predetermined threshold level, the processor 30 determines that the pulse is present and proceeds to 68 where the method ends. If the difference is not greater than the predetermined threshold level, the processor 30 determines that the pulse is not present and proceeds to 70. At 70, the processor 30 determines whether the pulse has not been present during a predetermined number of consecutive instances of the ground fault output self-test. If the processor 30 determines that the pulse has not been present during the predetermined number of consecutive instances of the ground fault output self-test, the processor 30 returns to 60 and repeats the ground fault output self-test. If the processor 30 determines that the pulse has been present during the predetermined number of consecutive instances of the ground fault output self-test, the processor 30 determines that the circuit interrupter 10 has failed the ground fault output self-test and proceeds to 72. At 72, the processor 30 outputs an error signal which may activate the indicator 50.

Figure 4:
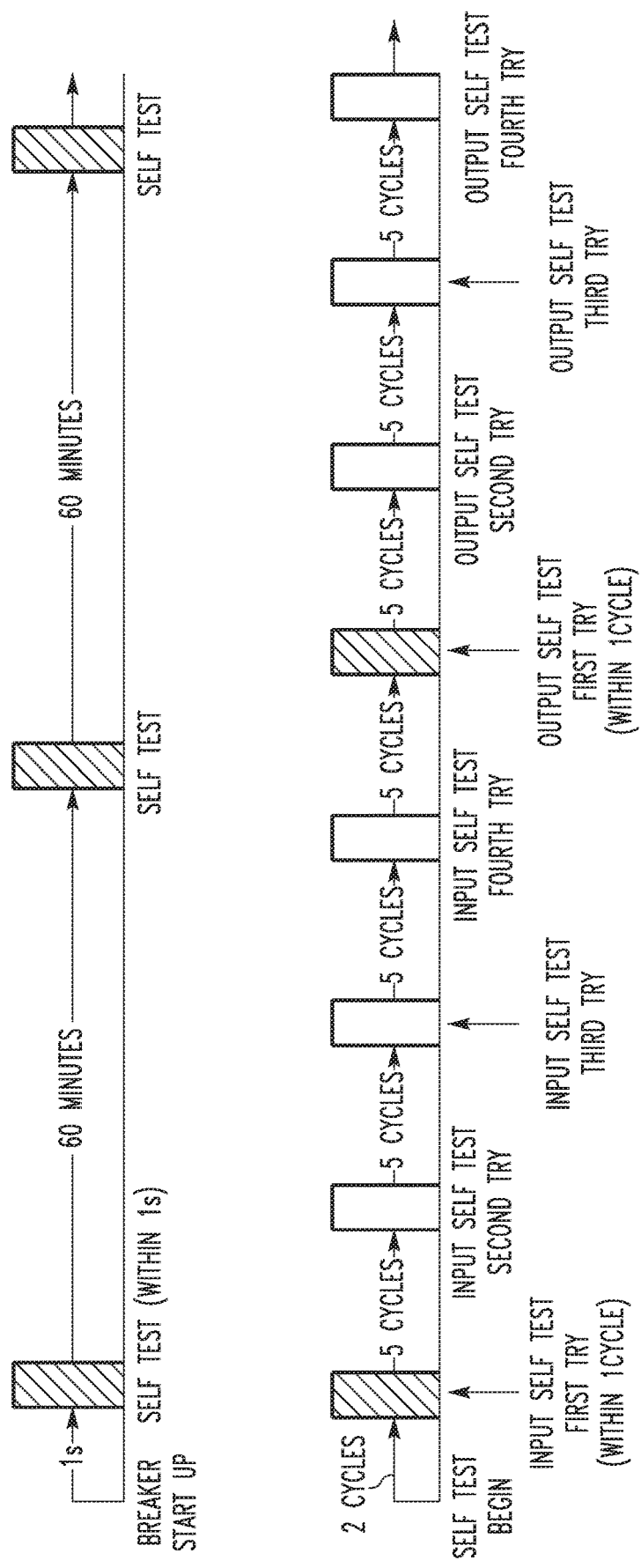
FIG. 4 is a schedule for performing ground fault self-tests in accordance with an example embodiment of the disclosed concept.

FIG. 4 is a chart of a self-test schedule in accordance with an example embodiment of the disclosed concept. The self-test schedule may be implemented in the circuit interrupter 10 of FIG. 1. It will be appreciated that the self-test schedule may be implemented in other circuit interrupters without departing from the scope of the disclosed concept.

The ground fault self-test for the circuit interrupter 10 includes the ground fault input self-test and the ground fault output self-test. The complete ground fault self-test may be performed at predetermined intervals. For example and without limitation, the predetermined interval shown in the example of FIG. 4 is 60 minutes. It will be appreciated that any interval may be selected without departing from the scope of the disclosed concept (e.g., without limitation, any interval between 1 second and 60 minutes or any other interval). The processor 30 may be structured to automatically perform the ground fault self-test at the predetermined intervals. The processor may be structured to perform the first ground fault self-test a predetermined time after the circuit interrupter 10 is initially powered on. In some example embodiments of the disclosed concept, the predetermined time is 1 second.

During each ground fault self-test, the processor 30 may be structured to first perform the ground fault input self-test and then perform the ground fault output self-test. The processor 30 may space each instance of the ground fault input self-test and the ground fault output self-test by a predetermined number of cycles. In some example embodiments of the disclosed concept, the predetermined number of cycles is 5.

In accordance with some example embodiments of the disclosed concept, the circuit interrupter 10 is able to perform a ground fault output self-test by outputting the trip signal and whether the pulse is present in the ground fault current. The ground fault output self-test does not cause the separable contacts 18 to trip open and does not interfere with normal ground fault monitoring because the pulse is short and expected.

The disclosed concept can also be embodied as computer readable codes on a tangible, non-transitory computer readable recording medium. The computer readable recording medium is any data storage device that can store data which can be thereafter read by a computer system. Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter structured to protect a protected circuit, the circuit interrupter comprising:
   a ground fault current sensor structured to sense a ground fault current in the protected circuit;
   a processor including a routine structured to perform a ground fault output self-test, the ground fault output self-test including:
      to output a trip signal within a predetermined phase angle of a zero-crossing of current flowing through the protected circuit;
      to stop outputting the trip signal before the zero-crossing;
      to determine whether the trip signal caused a pulse in the ground fault current; and
      to determine whether the circuit interrupter passed the ground fault output self-test based on whether the trip signal caused a pulse in the ground fault current.

2. The circuit interrupter of claim 1, wherein the processor is structured to determine that the circuit interrupter passed the ground fault output self-test when it is determined that the trip signal caused the pulse in the ground fault current; and wherein the processor is structured to determine that the circuit interrupter failed the ground fault output self-test when it is determined that the trip signal did not cause the pulse in the ground fault current.

3. The circuit interrupter of claim 2, wherein the processor is structured to repeat the ground fault output self-test if the circuit interrupter fails the ground fault output self-test; and wherein the processor is structured to output an error signal if the circuit interrupter fails the ground fault output self-test a predetermined consecutive number of times.

4. The circuit interrupter of claim 3, further comprising:
an indicator structured to activate in response to the processor outputting the error signal.

5. The circuit interrupter of claim 1, wherein the ground fault output self-test further includes:
to perform a first integration on the ground fault current for a first predetermined period of time where the pulse is expected to be present;
to perform a second integration on the ground fault current for a second predetermined period of time where the pulse is not expected to be present; and
to compare the first and second integrations, and
wherein the processor is structured to determine that the trip signal caused the pulse in the ground fault current if a difference between the first and second integrations is above a threshold level.

6. The circuit interrupter of claim 1, wherein the processor is structured to determine whether the trip signal caused a pulse in the ground fault current by tracking a peak value of the ground fault current.

7. The circuit interrupter of claim 1, further comprising:
separable contacts;
a solenoid structured to activate to trip open the separable contacts; and
a silicon controlled rectifier (SCR) structured to allow current from the protected circuit to flow through a coil of the solenoid when the processor outputs the trip signal,
wherein the current flowing through the protected circuit within the predetermined phase angle of the zero-crossing is insufficient to cause the solenoid to activate and trip open the separable contacts.

8. The circuit interrupter of claim 7, wherein the predetermined phase angle is about 15 degrees.

9. The circuit interrupter of claim 1, wherein the processor is structured to perform the ground fault output self-test at predetermined intervals.

10. The circuit interrupter of claim 1, wherein the processor is structured to perform a ground fault input self-test prior to performing the ground fault output self-test.

11. A method of performing a ground fault output self-test in a circuit interrupter structured to protect a protected circuit, the circuit interrupter including a ground fault current sensor structured to sense a ground fault current in the protected circuit, the method comprising:
outputting a trip signal within a predetermined phase angle of a zero-crossing of current flowing through a protected circuit;
stopping output of the trip signal before the zero-crossing;
determining whether the trip signal caused a pulse in the ground fault current; and
determining whether the ground fault output self-test has been passed based on whether the trip signal caused a pulse in the ground fault current.

12. The method of claim 11, further comprising:
determining that the ground fault output self-test has been passed when it is determined that the trip signal caused the pulse in the ground fault current; and
determining that the ground fault output self-test has been failed when it is determined that the trip signal did not cause the pulse in the ground fault current.

13. The method of claim 12, further comprising:
repeating the ground fault output self-test if the ground fault output self-test has been failed; and
outputting an error signal if the ground fault output self-test has been failed a predetermined consecutive number of times.

14. The method of claim 13, further comprising:
activating an indicator in response to outputting the error signal.

15. The method of claim 11, wherein determining whether the trip signal caused a pulse in the ground fault current includes:
performing a first integration on the ground fault current for a first predetermined period of time where the pulse is expected to be present;
performing a second integration on the ground fault current for a second predetermined period of time where the pulse is not expected to be present; and
comparing the first and second integrations; and
determining that the trip signal caused the pulse in the ground fault current if a difference between the first and second integrations is above a threshold level.

16. The method of claim 11, wherein determining whether the trip signal caused a pulse in the ground fault current includes:
determining whether the trip signal caused a pulse in the ground fault current by tracking a peak value of the ground fault current.

17. The method of claim 11, wherein the current flowing through the protected circuit within the predetermined phase angle of the zero-crossing is insufficient to cause a solenoid to activate and trip open separable contacts of the circuit interrupter.

18. The method of claim 17, wherein the predetermined phase angle is about 15 degrees.

19. A non-transitory computer readable medium storing one or more programs, including instructions, which when executed by a computer, causes the computer to perform a method of performing a ground fault output self-test in a circuit interrupter structured to protect a protected circuit, the circuit interrupter including a ground fault current sensor structured to sense a ground fault current in the protected circuit, the method comprising:
outputting a trip signal within a predetermined phase angle of a zero-crossing of current flowing through a protected circuit;
stopping output of the trip signal before the zero-crossing;
determining whether the trip signal caused a pulse in the ground fault current; and
determining whether the ground fault output self-test has been passed based on whether the trip signal caused a pulse in the ground fault current.

20. The non-transitory computer readable medium of claim 19, wherein the method further comprises:
determining that the ground fault output self-test has been passed when it is determined that the trip signal caused the pulse in the ground fault current; and
determining that the ground fault output self-test has been failed when it is determined that the trip signal did not cause the pulse in the ground fault current.

* * * * *